United States Patent
Shibata

Patent Number: 5,990,930
Date of Patent: Nov. 23, 1999

[54] IMAGE-AREA EXTRACTING METHOD FOR VISUAL TELEPHONE

[75] Inventor: Kikuko Shibata, Tokyo, Japan

[73] Assignee: Sharp Kabushiki Kaisha, Osaka, Japan

[21] Appl. No.: 09/121,872

[22] Filed: Jul. 24, 1998

[30] Foreign Application Priority Data

Jul. 28, 1997 [JP] Japan ................................. 9-201183

[51] Int. Cl.$^6$ ................................................. H04N 7/14
[52] U.S. Cl. ...................... 348/14; 379/93.17; 379/93.23
[58] Field of Search ................................ 348/14, 15, 20; 379/93.17, 93.21, 93.23; H04N 7/14

[56] References Cited

U.S. PATENT DOCUMENTS

| | | | |
|---|---|---|---|
| 5,583,565 | 12/1996 | Cortjens et al. | 348/15 |
| 5,657,246 | 8/1997 | Hogan et al. | 348/14 |

FOREIGN PATENT DOCUMENTS

| | | | |
|---|---|---|---|
| 60-169977 | 9/1985 | Japan . | |
| 406090444A | 3/1994 | Japan | H04N 7/14 |
| 406189303A | 7/1994 | Japan | H04N 7/14 |

*Primary Examiner*—Curtis A. Kuntz
*Assistant Examiner*—Melur Ramakrishnaiah

[57] ABSTRACT

A visual telephone terminal that allows the user to easily designate any desired area to be extracted from an image being shown on a display portion by an area-extracting frame or form prepared by using numeral keys and stored in storing means, requiring no additional cost. On the numeral keys on the visual telephone terminal, the user selects a numeral key corresponding to a start point of area-extracting frame or form, moves the start point to a desired position and fixes it at the position by pressing the start point key, then performs similar operations for selecting and deciding the second point, thus forming the area-extracting form on the image.

2 Claims, 13 Drawing Sheets

ENLARGED DETAIL OF NUMERAL KEYS

FUNCTIONS ASSIGNED TO RESPECTIVE KEYS WHEN EXTRACTING AN IMAGE AREA BY USING A QUADRANGULAR AREA-EXTRACTING FORM

1: ONE CORNER (TOP LEFT) POINT OF THE QUADRANGLE
3: ONE CORNER (TOP RIGHT) POINT OF THE QUADRANGLE
7: ONE CORNER (BOTTOM LEFT) POINT OF THE QUADRANGLE
9: ONE CORNER (BOTTOM RIGHT) POINT OF THE QUADRANGLE
2: CURSOR FOR MOVING UPWARD
4: CURSOR FOR MOVING LEFTWARD
6: CURSOR FOR MOVING RIGHTWARD
8: CURSOR FOR MOVING DOWNWARD

| FIG.4A | FIG.4B | FIG.4C |

FIG.4A

STEP 40

S28: A POINTER IS DISPLAYED ON THE DISPLAY PORTION

STEP 41

MOVE THE POINTER BY USING A CURSOR-FUNCTION KEY AND SELECT A START POINT OF A FIRST SIDE OF AN AREA-EXTRACTING QUADRANGLE. A LINE CAN BE DRAWN BY USING THE CURSOR-FUNCTION KEY. EXTEND THE LINE TO A DESIRED POSITION AND PRESS A KEY CORRESPONDING TO THE END POSITION

USING NUMERAL KEYS 2 AND 4 ON THE OPERATING PORTION, MOVE THE POINTER TO A DESIRED START POINT AND PRESS A NUMERAL KEY 1. CONTINUOUSLY PRESSING A NUMERAL KEY 6, MOVE THE POINTER RIGHTWARD TO DRAW A LINE

| FIG.5A | FIG.5B | FIG.5C |

FIG.5A

STEP 51

WHICH POSITION A REFERENCE POINT OF THE QUADRANGLE IS PLACED AT?
HAVING SELECTED THE POSITION BY USING A CORRESPONDING KEY, MOVE THE POINT TO THE DESIRED POSITION BY USING A CURSOR-FUNCTION KEY AND SELECT AGAIN THE REFERENCE POINT

PRESS THE NUMERAL KEY 1 ON THE OPERATING POTION, MOVE THE REFERENCE POINT OF THE QUADRANGLE TO THE DESIRED POSITION BY USING THE NUMERAL KEYS 2 AND 4 AND PRESS AGAIN THE NUMERAL KEY 1

STEP 50

S38: AN AREA-EXTRACTING FORM PREPARED BY THE USER IS DISPLAYED ON THE DISPLAY PORTION

FIG.5B

FIG.5C though the present invention relates to a visual telephone termi-
nal and more particularly to a method for extracting any
desired area on an image being displayed on the visual
telephone terminal having numeral keys on its operating
portion.

With a conventional visual telephone terminal, a user
usually designates an image area desired to be extracted
from an image being displayed on a display screen by using
a drawing control portion with a mouse or a light-pen for
easily drawing shapes on the display screen.

However, the drawing control portion must be externally
attached to a single-unit type visual telephone or a separate
visual display unit connected to a telephone set. Therefore,
it requires an additional cost.

The conventional single-unit type or two-units type visual
telephone terminal cannot be provided with an image-area
extracting facility at a low expense.

SUMMARY OF THE INVENTION

It is the main object of the present invention to incorporate
an image-area extracting function into a single-unit type
visual telephone terminal or a visual telephone terminal with
a display unit.

More specifically, it is an object of the present invention
to provide the single-unit type visual telephone terminal or
the telephone-connected type visual telephone terminal with
integral means for analogizing the layout of numeral keys on
an operating portion of the terminal with a form of an image
area to be extracted and specifying a desired area on an
image being shown on a display screen of the terminal by
using the numeral keys and integral means for storing the
image-area extracting frame used in a memory and using the
area-extracting frame for promptly defining a desired area
on another image by fixing one point of the frame as a
reference point on the image and adjusting the position of
the diagonal point relative to the reference point to expand
or compress the frame enclosing the desired area by using
the numeral keys.

It is another object of the present invention to provide the
visual telephone terminal with the above-described image-
area extracting means which can designate any desired area
on an image shown on a display screen by manipulating
numeral keys (push buttons) on the terminal (with no
additional cost).

It is another object of the present invention to provide the
visual telephone terminal which makes it possible to built,
for example, at a low cost a visual catalogue shopping
system that enables a user to try a new suit shown on the
display screen by exchanging a model face with his or her
face before purchasing that suit.

PREFERRED EMBODIMENT OF THE INVENTION

Referring now to the accompanying drawings, preferred
embodiments of the present invention will be described
below in detail.

Figure 1:
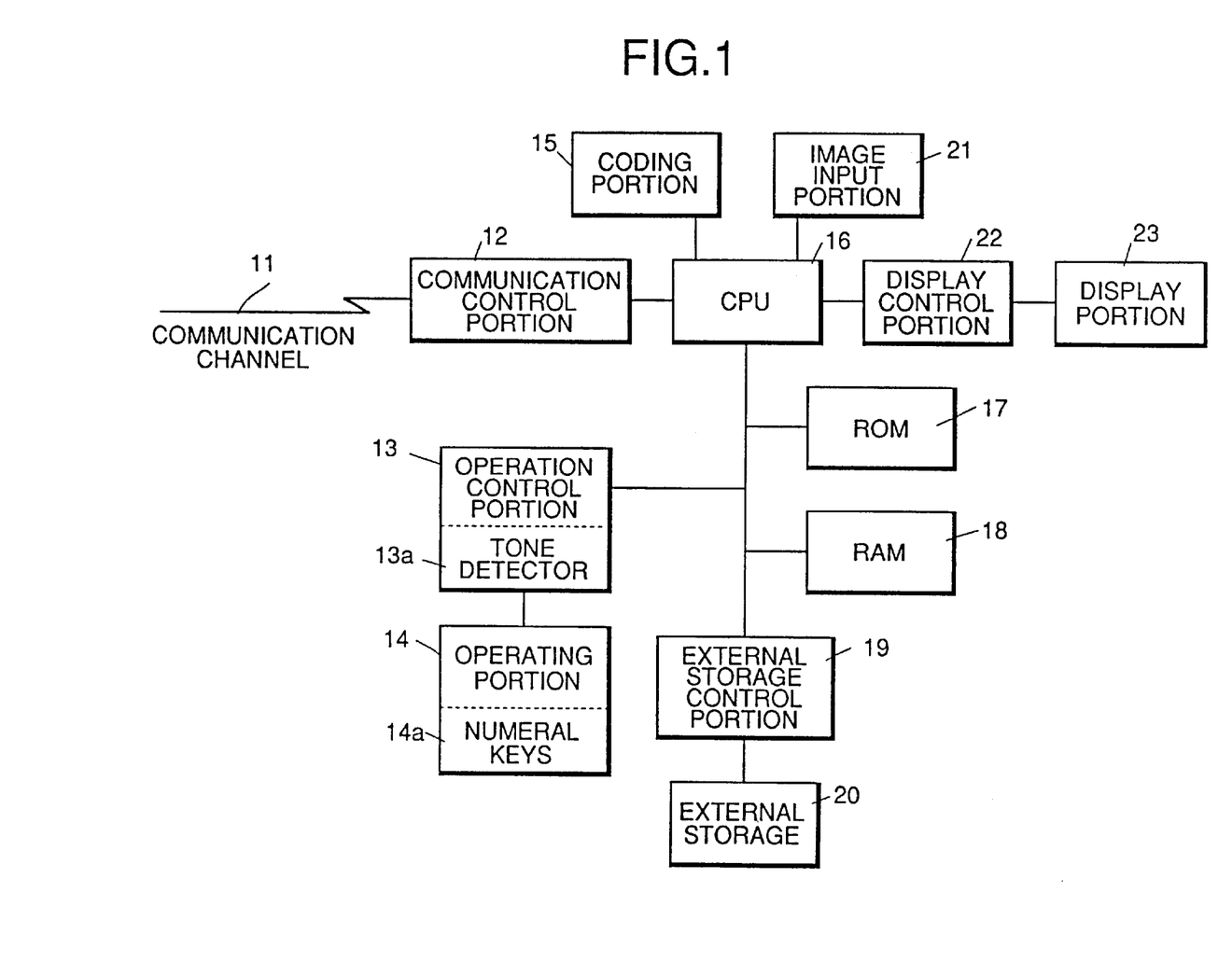
FIG. 1 is a block diagram showing a visual telephone
terminal for realizing an image-area extracting method
according to the present invention.

FIG. 1 is a construction block diagram of a visual tele-
phone terminal embodying the present invention. The visual
telephone terminal connected to a communication channel
11 comprises a communication control portion 12, an opera-
tion control portion 13, a tone detector 13a, an operating
portion 14, numeral (ten) keys 14a, a codec portion 15, CPU
(Central Processing Unit) 16, a ROM (Read Only Memory)
17, a RAM (Random Access Memory) 18, an external
storage control portion 19, an external storage 20, a video
image input portion 21, a display control portion 22 and a
display unit 23.

A signal including video information received over the
communication channel 11 is separated into video informa-
tion and other information by the communication control
portion 12 and then the video information is stored in the
RAM 18. The operation control portion 13 receives a
command signal from the operating portion 14 and performs
the display operation. The ROM 17 drives the CPU 16 to
read the video information from the RAM 18 and decode the
video information by the codec portion 15. The decoded
video information is displayed by the display control portion
22 on the display screen of the display unit 23.

The video information displayed on the display unit 23
can be stored in the external storage 20 through the external
storage control portion 19 according to a command signal
inputted through the operating portion 14.

In this embodiment, the operation control portion 13, a
tone detecting portion 13a, the operating portion 14 and
numeral keys 14a are provided specifically for carrying out
the image-area extraction according to the present invention.

Figure 2:
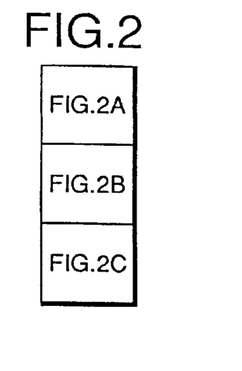
FIG. 2 shows the correct alignment of the drawing sheets
for FIGS. 2A, 2B and 2C.
Figure 2A:
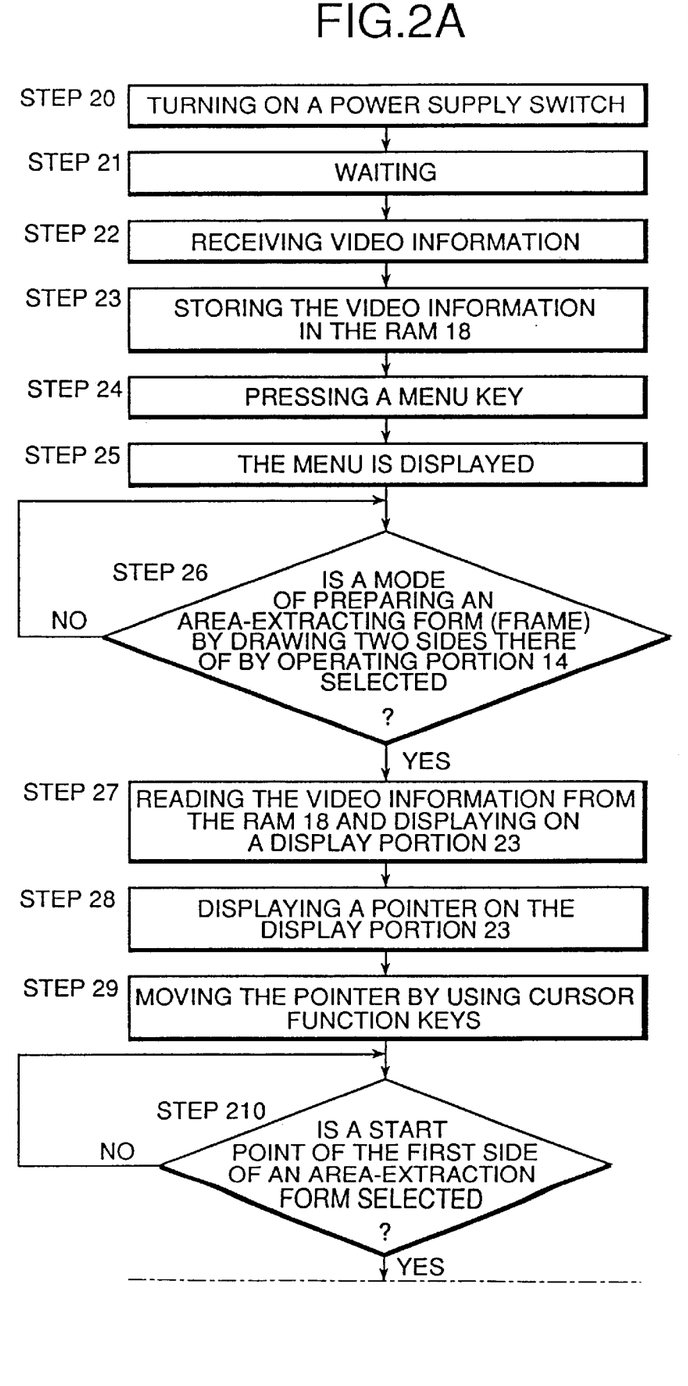
FIGS. 2A, 2B and 2C are flow chart depicting a procedure
of extracting an image-area on a visual telephone terminal
according to the present invention.
Figure 2B:
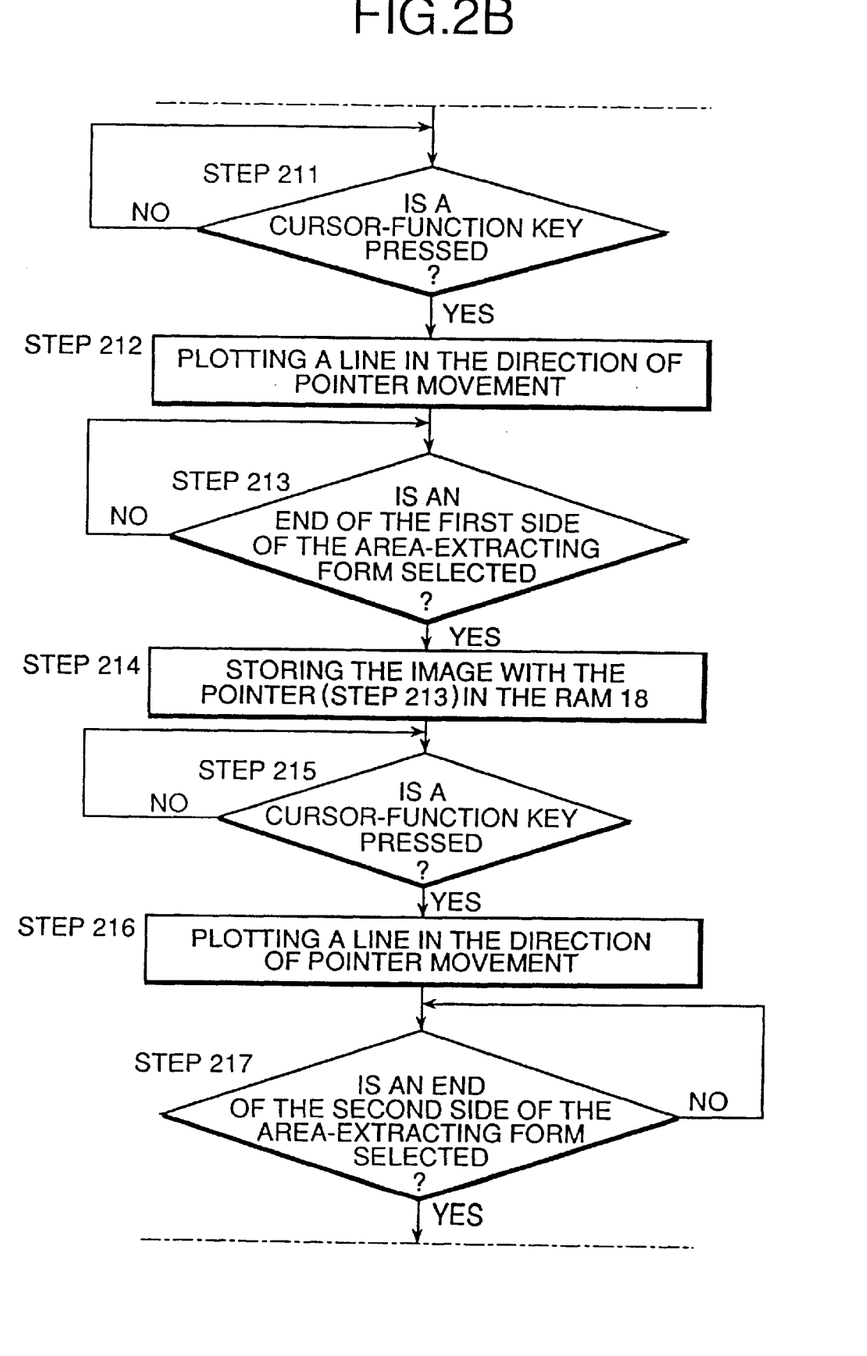
Figure 2C:
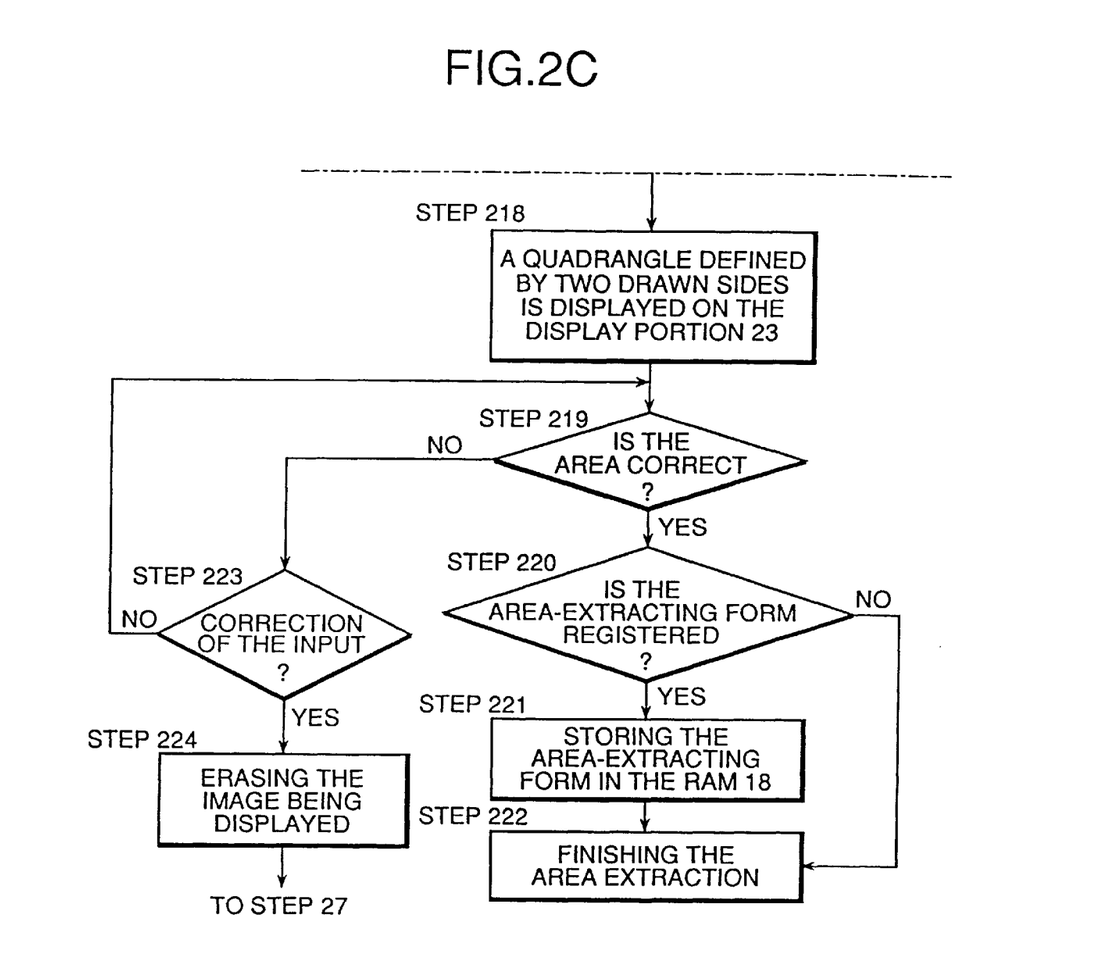

FIGS. 2A, 2B and 2C are flow chart depicting the pro-
cedure of extracting an area from an image displayed on a
visual telephone terminal according to an aspect of the
present invention.

Referring to FIGS. 2A, 2B and 2C, the operation of the
embodiment will be described below.

The terminal is switched on (Step S20) and becomes in
waiting state (Step S21). Video information is input or
received (Step S22) and stored in the RAM 18. When it is
desired to extract an area of the image being displayed on a display screen, a menu key is pressed (Step S24). The menu is displayed on the display screen (Step S25).

A mode of extracting an image area by using an area-extracting quadrangle, which can be specified by two sides, is selected from the menu (Step S26). The image information is read from the RAM 18 and displayed on the display portion 23 (Step S27). A pointer for drawing the area-extracting frame is also shown on the image being displayed (Step S28).

The pointer is moved along one side of a desired image area on the display screen by manipulating numeral keys to which cursor-functions are assigned among the numeral keys 13a disposed on the operating portion 13 (Step S29).

The image-area extracting method of the present invention is featured by using numeral keys to which functions necessary for specifying an area of an image being shown on the display screen are assigned. For example, an area-extracting frame is a quadrangle whose four corner points are represented by four numeral keys: a top-left point by a key "1", a top-right point by a key "3", a bottom-left point by a key "7" and a bottom-right point by a key "9" (see FIG. 6).

Figure 6:
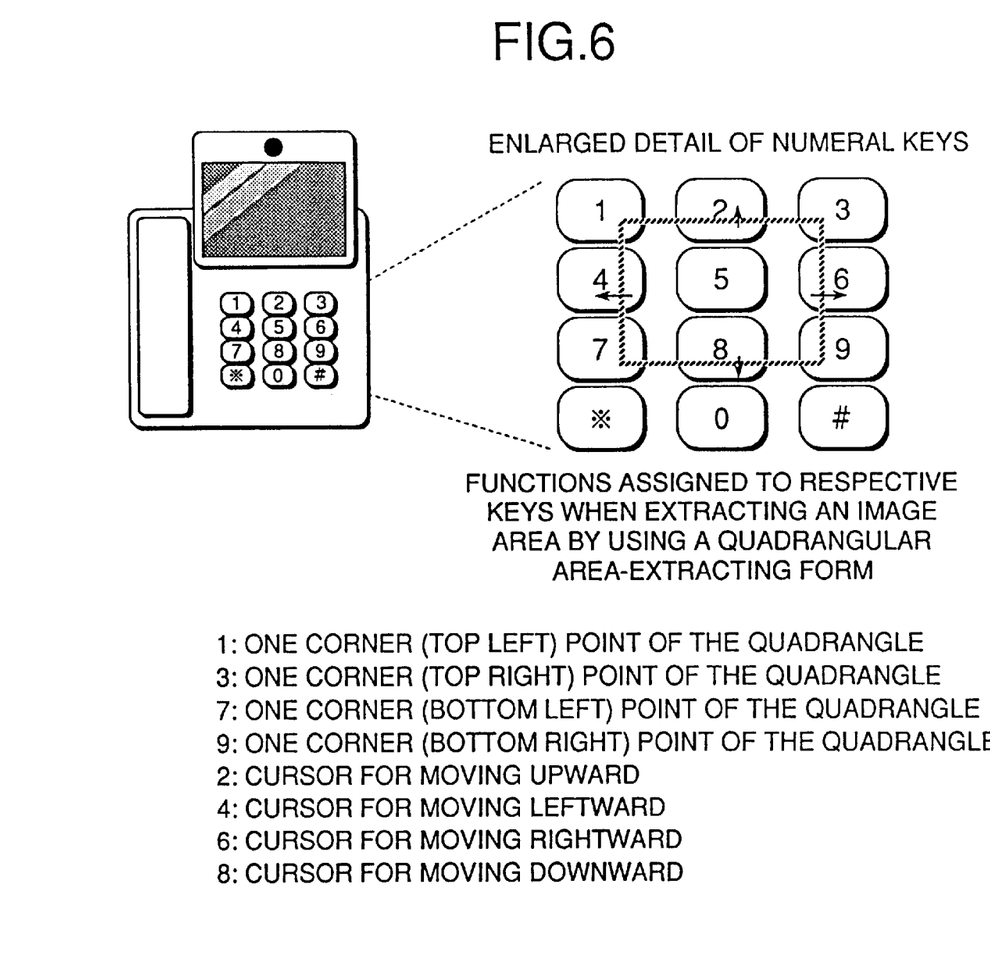
FIG. 6 is illustrative of a visual telephone with numerical
keys which are given specific functions for carrying out
image-area extraction according to the present invention.

The cursor functions are assigned to other numeral keys, i.e., keys "2" "4" "6" and "8" are used for moving a pointer upward, leftward, rightward and downward respectively.

Of course, the assignment of functions to the numeral keys may be modified depending upon the image-area extracting form. In this embodiment, a quadrangular frame or form is used for convenience of explanation.

After the pointer is positioned at a start point and the start point is selected by pressing a key corresponding to a start point of the first side (Step S210), procedure advances to Step S211 and a line from the start point is drawn on the image by continuously pressing the cursor function key (Step 212). However, the CPU does not advance the procedure to the next step until the user operates the corresponding keys at Step S210 and S211.

A key corresponding to an end of the first side is selected (Step S213). The image together with information on the pointer positions at Step S213 is stored in the RAM 18. As first side of the area has been drawn at Step S213, pressing the cursor function key (Step S215) results in drawing a second side from the first-side end position (Step S216) in the direction of the cursor movement.

The end of the second side is selected (Step S217). A quadrangular area defined by the two drawn sides is indicated on the image shown on the display portion 23 (Step S218). The extractable area is confirmed (Step S219). It is then decided whether the confirmed form (area-extracting frame) is registered in the RAM 18 or not.

The area-extracting frame is stored in the RAM 18 (Step S221) and the area-extracting procedure ends. If the registration of the frame or form is not desired (at Step S220), the procedure advances to Step S222 and ends.

When the area-extraction was not confirmed at Step S219, the procedure proceeds to Step S223 for deciding whether the extracting form is corrected or not. If correction is needed, the CPU erases all the image being displayed at Step S224 and then returns the procedure to Step S27 to start the input operation.

Figure 3:
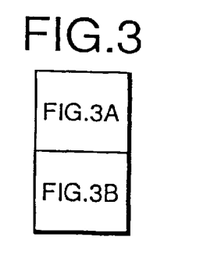
FIG. 3 shows the correct alignment of the drawing sheets
for FIGS. 3A and 3B.
Figure 3A:
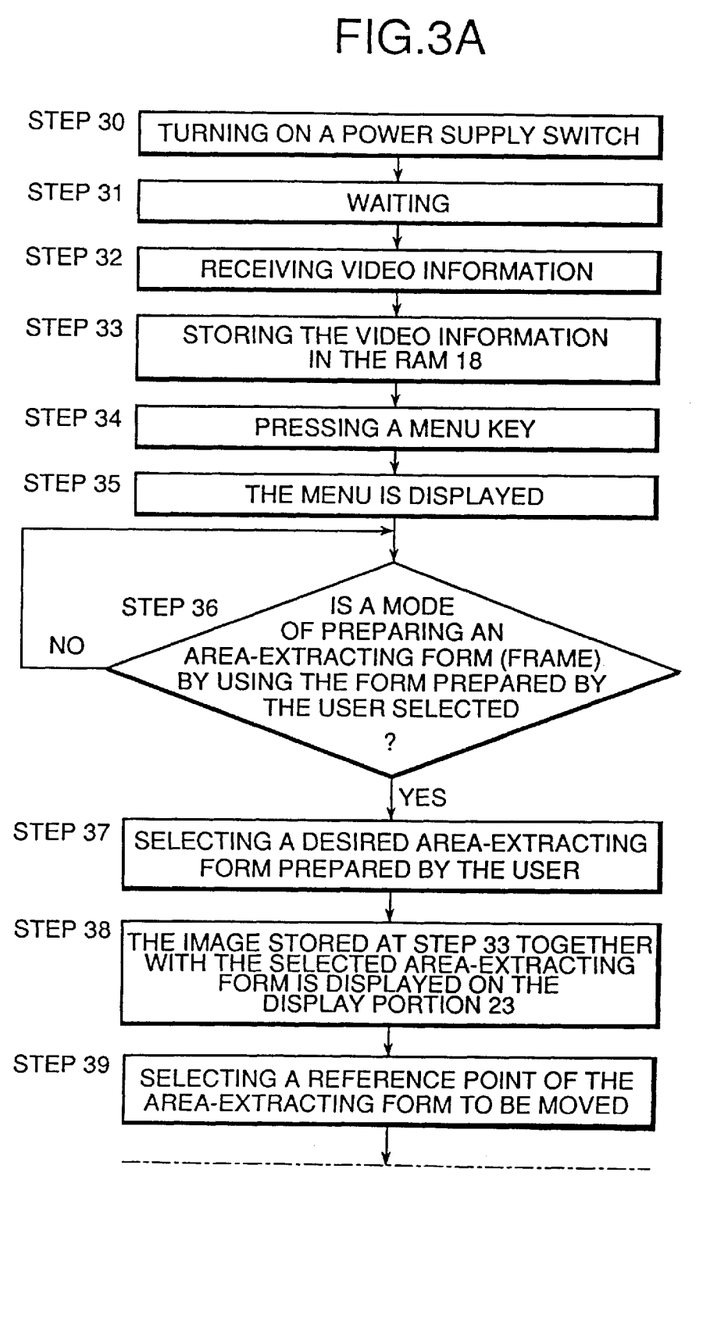
FIGS. 3A and 3B are flow chart depicting a procedure of
extracting an image-area on a visual telephone terminal
according to the present invention.
Figure 3B:
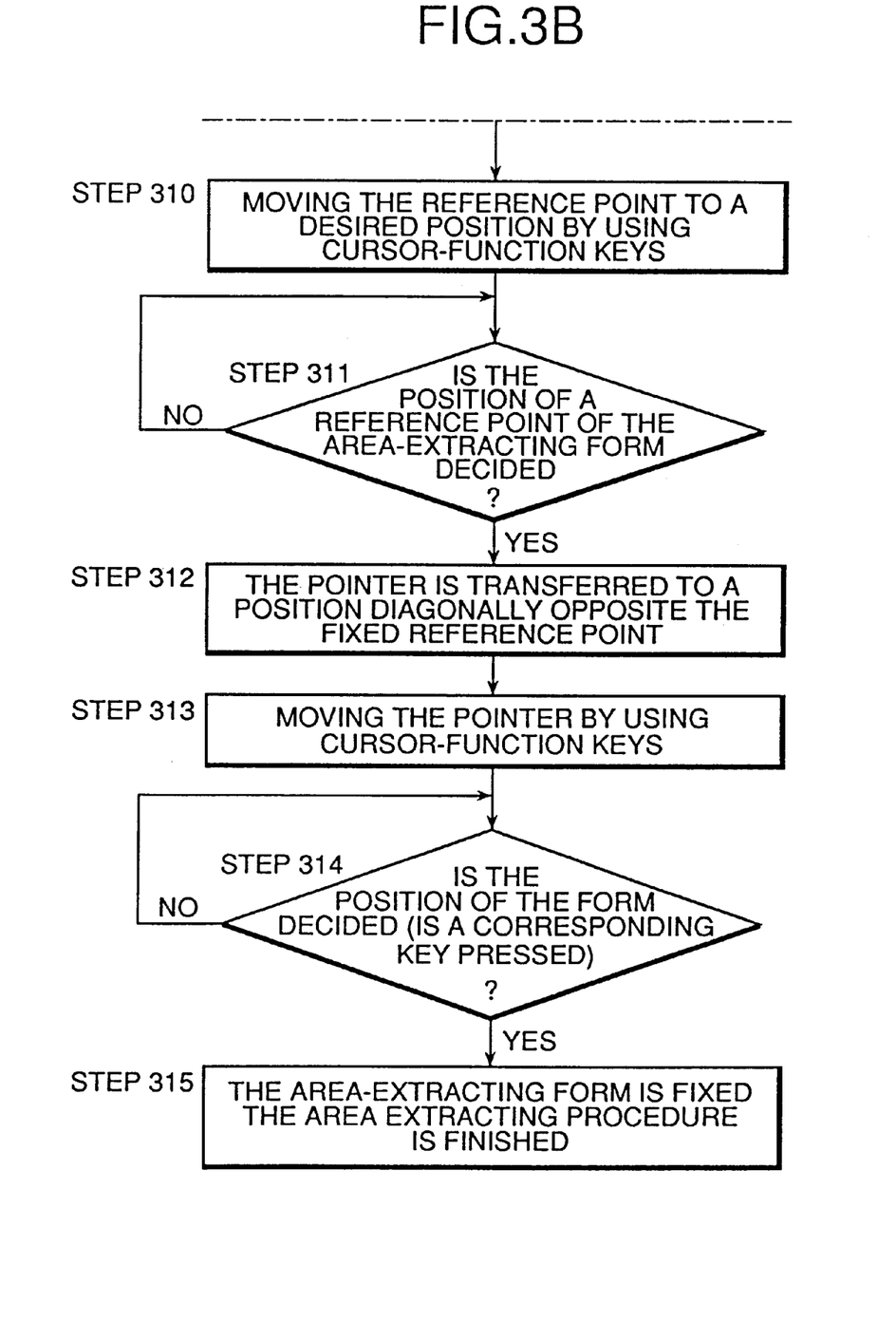

FIGS. 3A and 3B are flow chart depicting the image-area extracting procedure with a visual telephone according to the present invention. Referring to FIGS. 3A and 3B, the operation of the visual telephone according to the method of the present invention will be described below:

The power switch is turned ON (Step S30) and the visual telephone enters into a state waiting for an input (Step S31). Video information is input or received (Step S32) and stored in the RAM 18.

In extracting an image area from the input or received image, the user selects a menu by pressing the menu key (Step S34). The menu is displayed on the display screen (Step S35).

When the user selects the use of previously prepared and registered frame (Step S36) and designates one of the area extracting frames or forms (Step S37), the image information is read from the RAM 18 (Step S38) and displayed on the display portion 23 and, at the same time, the area-extracting frame or form selected at Step S37 is also shown thereon on the display portion 23.

In order to position the area-extracting frame or form at a desired position on the image, the user first selects the reference (start) point by pressing a corresponding key among the numeral keys 14a (Step S39), then moves the reference point by manipulating cursor-function keys (among the numeral keys 14a) to a desired position (Step S310) and finally decides the position by pressing again the key first pressed for selecting the reference point (Step S311).

On completion of positioning the reference point, the pointer is automatically shifted to a position diagonally opposite to the reference point (Step S312). The user moves the pointer on the image by using a cursor-function key. The area-extracting frame or form appears on the image and is enlarged or compressed with the movement of the pointer. Thus the area-extracting frame or form can be adjusted to any desired size on the image shown on the display portion (Step S313).

The point being moved by the cursor is fixed at any position when the key corresponding to the corner point of the quadrangular frame or form on the numeral keys 14a is pressed by the user (Step S314). The area-extracting procedure is finished (Step S315).

Figures 4, 4A:
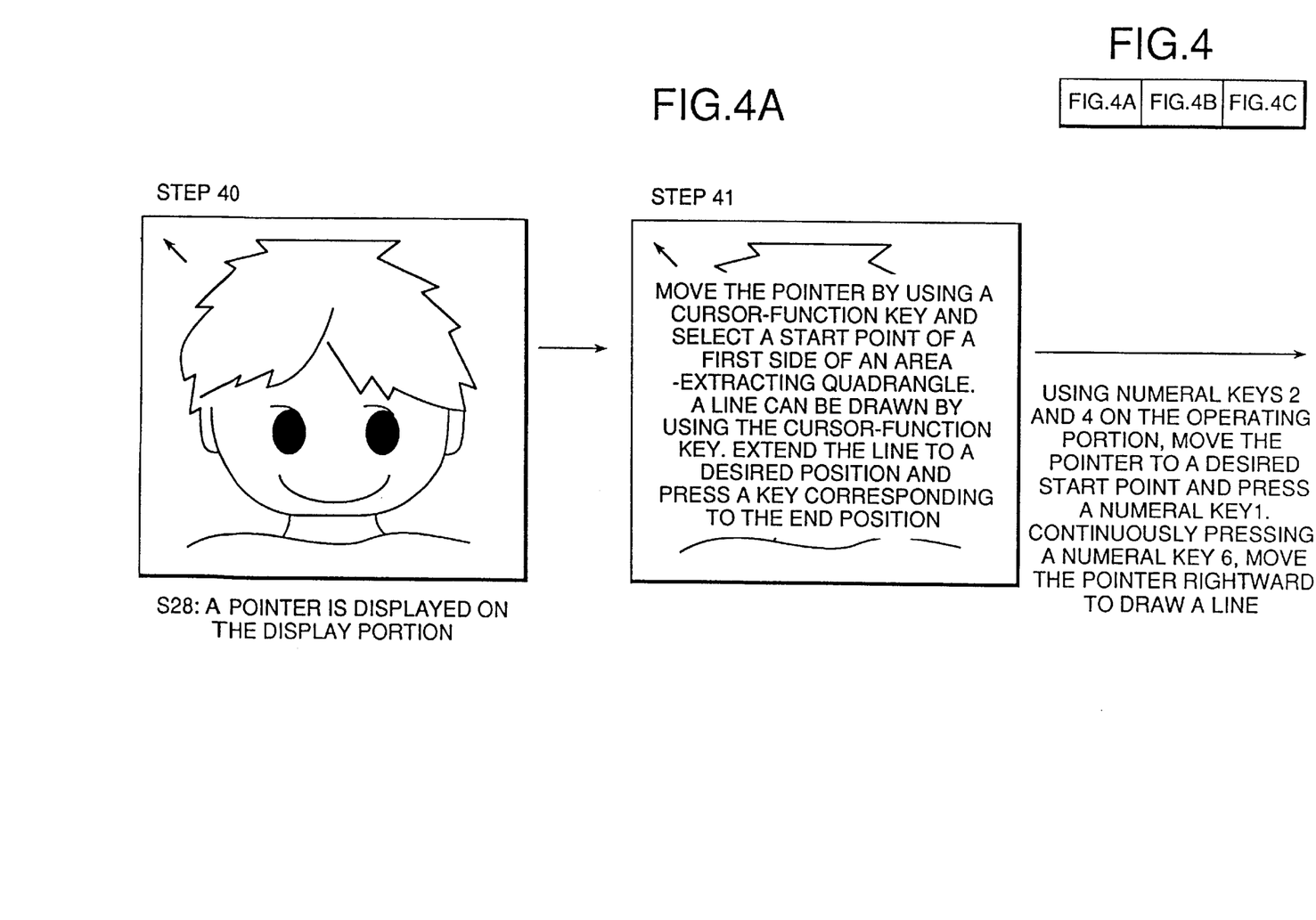
FIG. 4 shows the correct alignment of the drawing sheets
for FIGS. 4A, 4B and 4C.
FIGS. 4A, 4B and 4C are illustrative of transition screen
images on a visual telephone when carrying out an image
extraction according to the present invention.
Figure 4B:
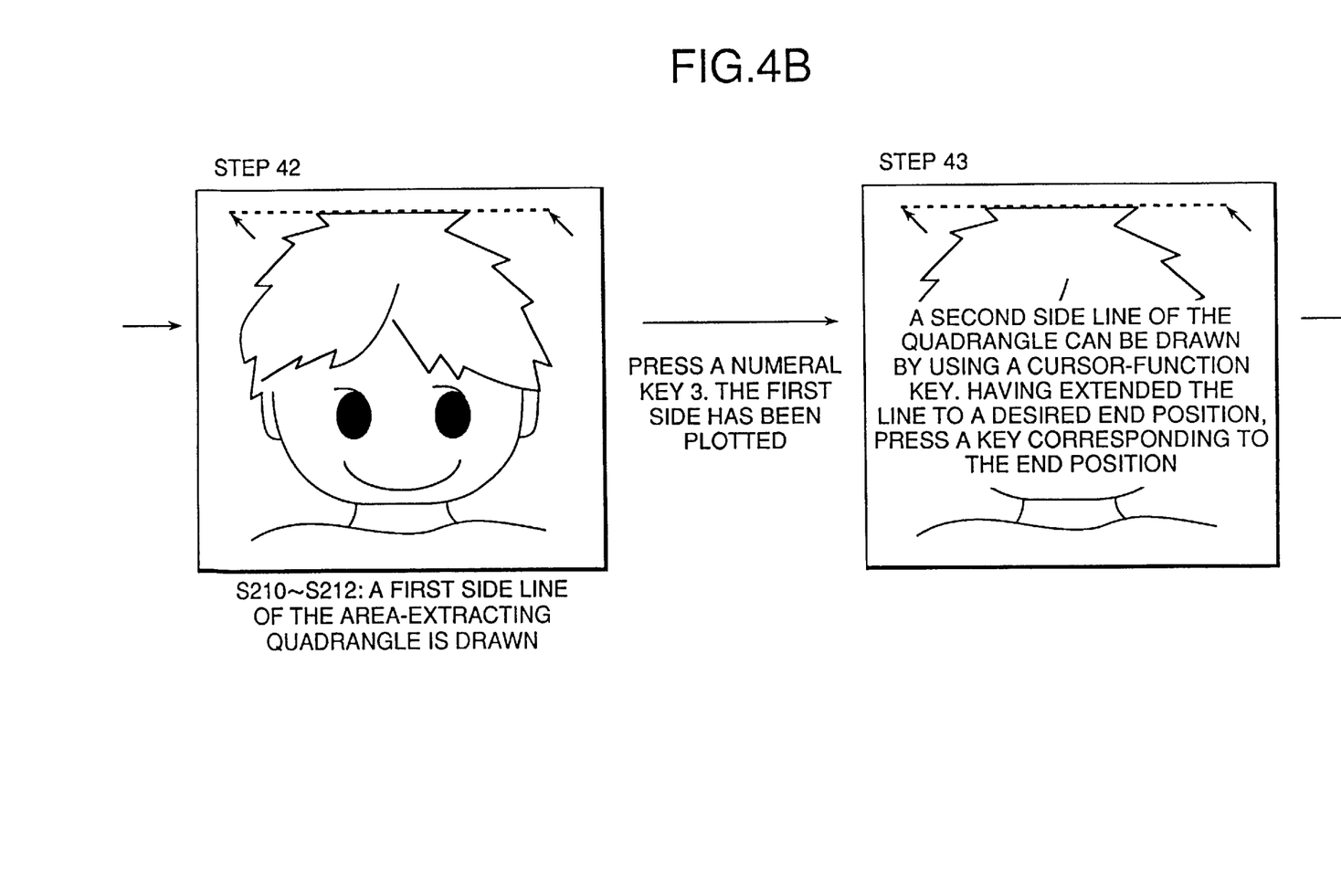
Figure 4C:
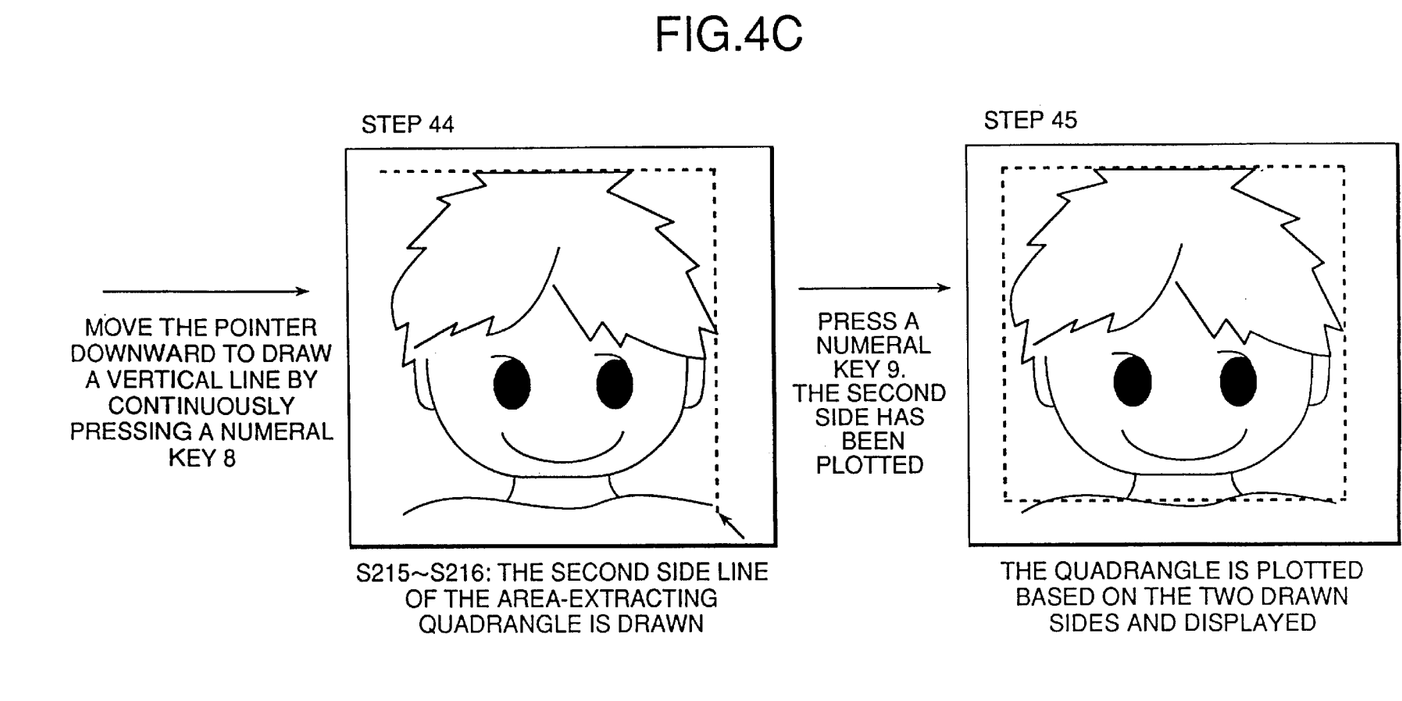

FIGS. 4A, 4B and 4C depict a transition of an image displayed on the display portion while extracting an image area by using a quadrangular area-extracting frame or form according to the method as defined in claim 1. In FIGS. 4A, 4B and 4C, messages for explaining the respective steps are shown on respective images being displayed, which, however, may be omitted or shown without the images. The display image transition steps will be described below referring also to the area-extracting procedure steps of FIGS. 2A, 2B and 2C.

An image (Step S40) is illustrative of the area-extracting procedure step S28 of FIG. 2A. An image and a pointer are displayed on the display portion. A next image (Step S41) depicts the subsequent operating steps to be performed by the user, which image may be omitted.

The display image changes to an image (Step S42) which reflects operations made by the user on the operating portion 14 (with numeral keys 14a) to move the pointer by using the numeral keys "2" and "4", fix the position at a top left position as a start point by pressing the numeral key "1" and plot a line rightward from the start point by continuously pressing the numeral key "6" for moving the pointer rightward. Namely, this image concerns the image-area extracting procedure steps S210 to S212 (FIGS. 2A and 2B).

The numeral key "3" corresponding to an end of a first side of the quadrangular area-extracting form is pressed. The display image changes to a subsequent image (Step S42) showing a message for explaining a procedure of plotting a second side of the quadrangular frame or form. However, this message may be omitted if it is so desired.

The numeral key "8" on the operating portion 14 with the numeral-keys 14a is continuously pressed by the user. The display image changes to a subsequent image (Step S44) in which the second side of the quadrangle is being drawn. The numeral key "9" corresponding to an end of the second side of the area-extracting quadrangle is pressed. The display image changes to a subsequent image (Step S45) showing that the second side of the quadrangle is decided and the quadrangle for extracting a desired image area is prepared based on the two plotted sides. (This image concerns the step S218 of FIG. 2C.)

Figure 5:
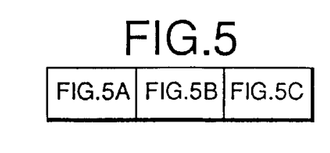
FIG. 5 shows the correct alignment of the drawing sheets
for FIGS. 5A, 5B and 5C.
Figure 5A:
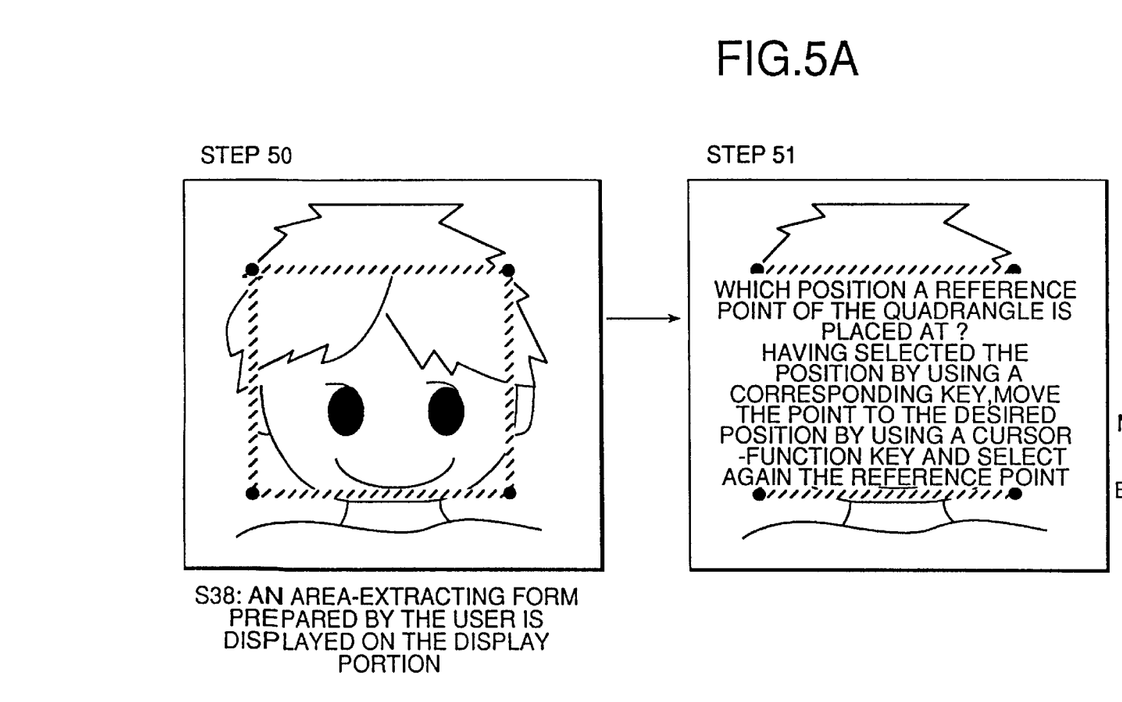
FIGS. 5A, 5B and 5C are illustrative of transition screen
images on a visual telephone when carrying out an image
extraction according to the present invention.
Figure 5B:
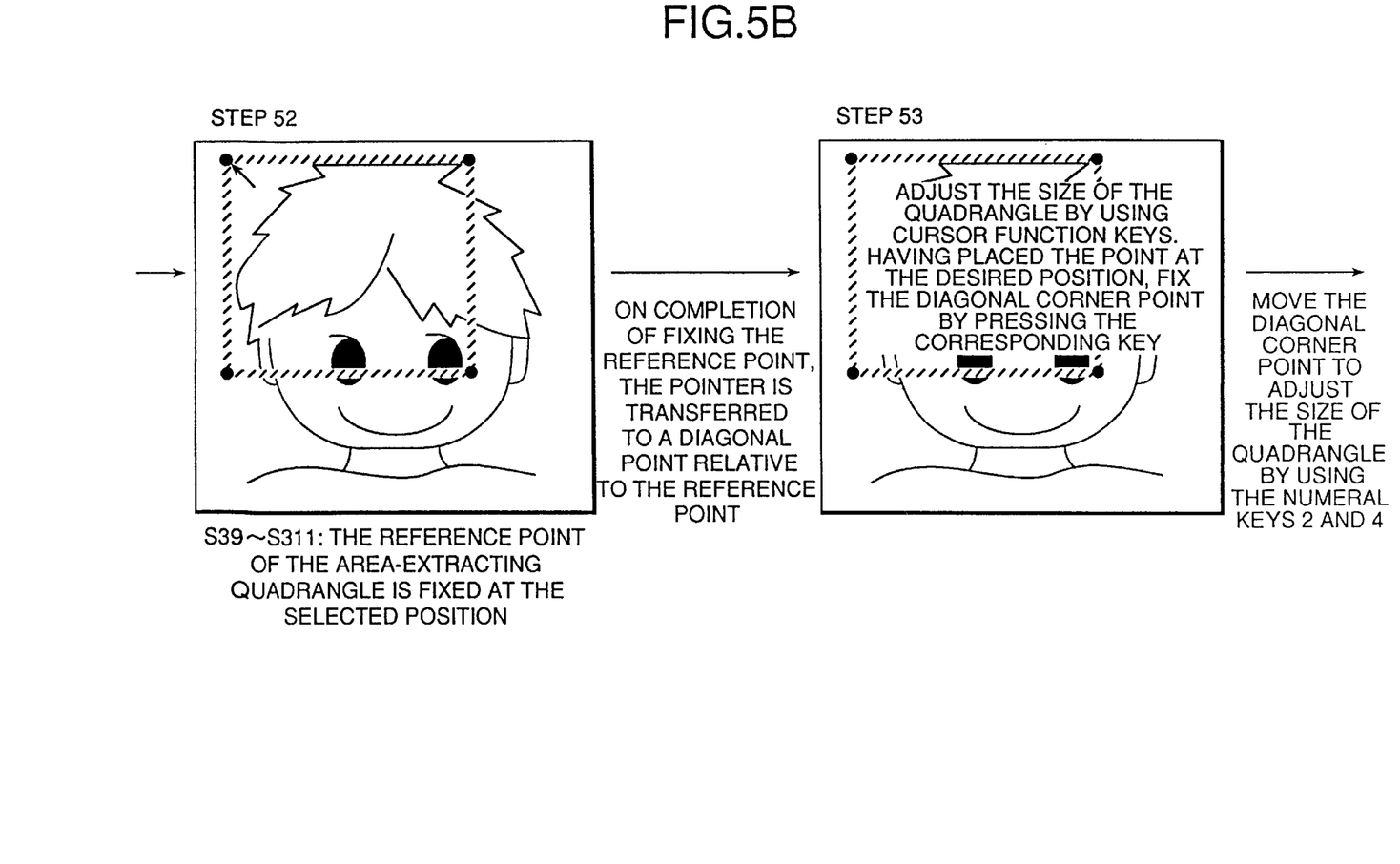
Figure 5C:
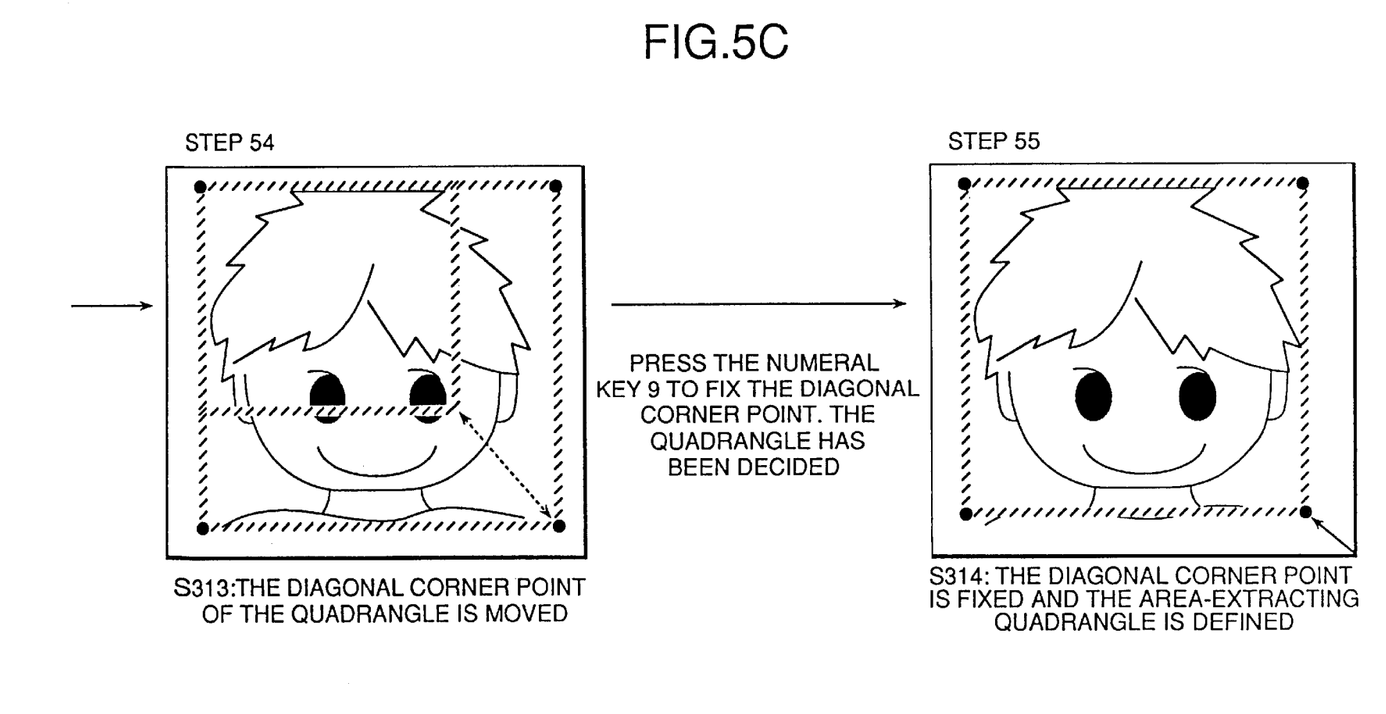

FIGS. 5A, 5B and 5C depicts a transition of an image displayed on the display portion while extracting an image area by using one of the registered quadrangular area-extracting frame or forms according to the method of the present invention In FIGS. 5A, 5B and 5C, messages for explaining the respective steps are shown on respective images to be displayed, which massage, however, may be shown otherwise or omitted.

The display image transition steps will be described below referring also to the area-extracting procedure steps of FIGS. 3A and 3B.

A display image (Step S50) is illustrative of the area-extracting procedure step S38 of FIG. 3A. After the step S52, an image (Step S51) is shown for explaining the subsequent operating steps, which image may be omitted if so programmed.

In the case when the user desired to set a reference point at a top left position, he or she presses the numeral key "1" corresponding to a top-left point of a quadrangular area-extracting frame or form on the operating portion 14 with the numeral-keys 14a and moves the pointer to a desired top-left position on the image being displayed by using numeral keys "2" and "4" to which cursor functions are assigned.

The user presses again the numeral key "1" to fix the reference point at the selected position. The display image changes to an image (Step S52) that reflects the procedure from Step S39 to Step S311 of FIGS. 3A and 3B.

As soon as the reference point is fixed, the pointer is automatically transferred to a diagonal point of the area-extracting quadrangle and a massage for subsequent procedure step appears on the image if such a message has been programmed (Step S53). In the shown case, the pointer is transferred from the top left to the bottom right when the key "1" was pressed for fixing the reference point.

The pointer at the bottom right position is further moved by using the numeral keys "2" and "4" to a suitable position to adjust the size of the area-extracting quadrangle. The display shows an image of Step S54. The user can adjust the size of the quadrangle observing the change of the form with the pointer's movement on the display image. The desired size of the quadrangle can be fixed by pressing the numeral key "9" corresponding to the bottom right position.

At this time, the display shows an image of Step S55 (FIG. 5C), which corresponds to the procedure step S314 of FIG. 3B.

FIG. 6 shows an exemplary visual-telephone terminal according to the present invention. An enlarged detail of the numeral keys depicts an exemplified assignment of functions for carrying out the image-area extracting method of the present invention.

As is apparent from the foregoing, the present invention offers the following advantages:

The visual telephone terminal provided with the above-described image-area extracting means can designate any desired area on an image shown on a display screen by manipulating numeral keys (push buttons) on the terminal (with no additional cost). This makes it possible to built, for example, at a low cost a visual catalogue shopping system that enables a user to try a new suit shown on the display screen by exchanging a model face with his or her face before purchasing that suit.

I claim:

1. An image-area extracting method for visual telephone terminal provided with a video displaying means for receiving a video signal transmitted over a communication channel through a communication control portion, converting the received signal by a converting portion and displaying a received video image by a display control portion, and an image storing means for storing the received video image, wherein an objective area (e.g., a face area) can be extracted from an image being displayed by an area-extracting frame line formed by using analogy of a layout of numeral keys arranged on the visual telephone terminal.

2. An image-area extracting method for visual telephone terminal as defined in claim 1, wherein the image-area extracting frame used is stored in the image storing portion to be used later for promptly specifying a desired objective area on the image by fixing one point of the image-area extracting frame as a reference point at a desired position on the image and then adjusting the position of a diagonal point relative to the reference point to expand or compress the frame enclosing the desired objective area by using the numeral keys arranged on the visual telephone terminal.

* * * * *